US012764086B2

(12) United States Patent
Gupta

(10) Patent No.: US 12,764,086 B2
(45) Date of Patent: Oct. 13, 2026

(54) SYSTEMS AND METHODS FOR GENERATING A TRACKING DOCUMENT IN A DOCUMENT MANAGEMENT SYSTEM USING DATA EXTRACTED FROM A MESSAGING SESSION

(71) Applicants: Atlassian Pty Ltd., Sydney (AU); Atlassian Inc., San Francisco, CA (US)

(72) Inventor: Vishesh Gupta, Bengaluru (IN)

(73) Assignees: ATLASSIAN PTY LTD, Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/852,281

(22) Filed: Jun. 28, 2022

(65) Prior Publication Data

US 2023/0421520 A1 Dec. 28, 2023

(51) Int. Cl.

| | |
|---|---|
| ***H04L 51/216*** | (2022.01) |
| ***G06F 40/289*** | (2020.01) |
| ***G06Q 10/101*** | (2023.01) |
| ***H04L 51/04*** | (2022.01) |

(52) U.S. Cl.

CPC .......... *H04L 51/216* (2022.05); *G06F 40/289* (2020.01); *G06Q 10/101* (2013.01); *H04L 51/04* (2013.01)

(58) Field of Classification Search

CPC ..... H04L 51/216; H04L 51/04; G06F 40/289; G06Q 10/101

See application file for complete search history.

(56) References Cited

U.S. PATENT DOCUMENTS

| | | | | |
|---|---|---|---|---|
| 11,763,089 | B2 * | 9/2023 | Fox | G06F 40/30 704/9 |
| 2015/0256675 | A1 * | 9/2015 | Sri | H04M 3/5183 379/265.09 |
| 2018/0316635 | A1 * | 11/2018 | Chiu | G06F 40/30 |
| 2020/0192981 | A1 * | 6/2020 | Fox | G06F 40/30 |
| 2020/0257762 | A1 * | 8/2020 | Eskamani | G06N 20/00 |
| 2021/0158813 | A1 * | 5/2021 | Sivasubramanian | G06Q 10/107 |
| 2021/0209307 | A1 * | 7/2021 | Serna | G06F 40/30 |
| 2021/0358488 | A1 * | 11/2021 | Iyer | G10L 15/25 |
| 2022/0037003 | A1 * | 2/2022 | Oliveira | G06F 8/38 |
| 2022/0166730 | A1 * | 5/2022 | Bastide | H04L 65/80 |
| 2022/0294754 | A1 * | 9/2022 | Rozenbaum | H04L 51/216 |

(Continued)

*Primary Examiner* — Joseph L Greene

(74) *Attorney, Agent, or Firm* — Brownstein Hyatt Farber Schreck, LLP

(57) ABSTRACT

Described herein is a method that includes obtaining a first set of messages from the online chat and analyzing the first set of messages to identify a decision flag portion based on content extracted from the first set of messages. The method includes determining, based on the decision flag portion, a decision topic and a decision author, and identifying a subset of messages from the first set of messages having content corresponding to the decision topic. The method includes analyzing the subset of messages to determine a sentiment of one or more messages included in the subset of messages. The method includes generating a table content item including the decision topic or the decision author, and at least an indicium related to the sentiment, and importing the table content item into a content page for displaying in response to a request to view the content page.

20 Claims, 9 Drawing Sheets

(56) References Cited

U.S. PATENT DOCUMENTS

| | | | | |
|---|---|---|---|---|
| 2022/0366448 | A1* | 11/2022 | Doumar | G06Q 30/01 |
| 2022/0377035 | A1* | 11/2022 | Shapiro | H04L 51/063 |

* cited by examiner

SYSTEMS AND METHODS FOR GENERATING A TRACKING DOCUMENT IN A DOCUMENT MANAGEMENT SYSTEM USING DATA EXTRACTED FROM A MESSAGING SESSION

TECHNICAL FIELD

Embodiments described herein generally relate to integration of online messaging services and document management services and, more specifically, related to a system for generating a tracking document in a document management system using data extracted from an online messaging session provided by online messaging services.

BACKGROUND

Online messaging tools and services can offer an effective platform for collaboration between team members of an organization. While online messaging services are well-suited for managing ephemeral streams used to exchange information in real time, most online messaging services do not provide the ability to document key elements of a chat and preserve the data in a form that can be easily referenced by a larger group of users. In general, data produced during an online chat, messaging, and/or virtual meetings is typically not easily accessed because the data is typically managed exclusively by a messaging tool or platform and not amendable to storage in a separate documentation tool or platform. Additionally, the amount of chat or messaging data managed by an online messaging service can be voluminous, and key or related data is typically sparsely dispersed within the greater data set. Further complicating access and documentation, the messaging data is not typically indexed in a way that allows a particular topic or decision to be effectively tracked and documented. The systems and techniques described herein provide an integration between an online messaging service and a document management service, which solves some of the data management problems of current online messaging systems.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
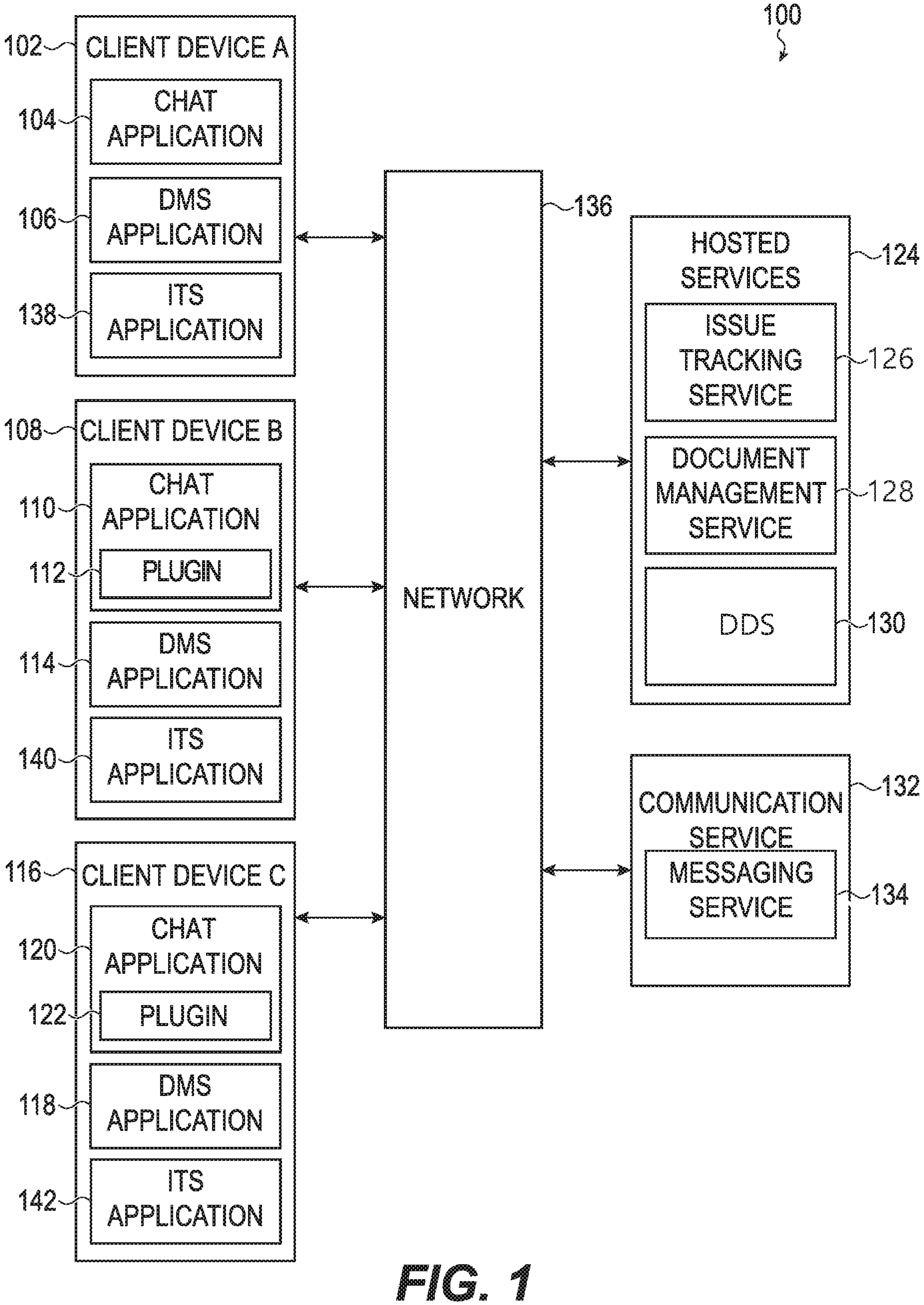
FIG. 1 depicts an example network of computer systems, as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for generating a tracking document or page that includes data extracted from a series of online messages produced using a separate online messaging platform. Digital content of various online chat sessions and/or meetings conducted on an online messaging tool or service may be analyzed by a decision documenting service (DDS). The DDS may analyze the messaging data produced by the online chat sessions and/or meetings to identify a seminal message, which may include content related to an initial decision topic being discussed during the online chat sessions and/or meetings. Upon identifying the seminal message, the DDS may analyze the digital content of a set of messages associated with one or more online chat sessions and extract one or more subsets of messages that are predicted to be related to the seminal message. For extracted messages of the subset of messages, a sentiment analysis may be performed on one or more of the messages and a summary of the message may be transmitted to a separate collaboration or document management platform and stored in a related document or page associated with the topic extracted from the seminal message. Additional information may be extracted from the subset of messages including predicted options, proposal content, and indicia of consensus. In accordance with message data extracted from the online messaging system, the DDS may interface with a document management platform or collaboration platform to maintain a tracking page or tracking document having a formatting protocol for transforming the extracted data into content for viewing by users of the document management platform or collaboration platform.

More generally, as may be appreciated by a person of skill in the art, a DDS may also analyze, in addition to the digital content of the online chat sessions and/or meetings, a number of webpages, online documents, transcripts of chat sessions and/or online meetings, images, and/or videos stored at a document management system or at any storage system. The DDS may use one or more natural language parsing models, and/or a set of keywords, phrases, symbols, and/or icons, to identify a decision topic, a decision resolution, and/or sentiments (e.g., likes, dislikes, statements in favor and/or opposition of the decision topic, and/or the decision resolution), and so on, of participant users (which may also be referred to herein as stakeholders). The DDS may then generate and/or update a document page describing decision related items.

Accordingly, various embodiments described herein may be used to analyze messaging data to automatically identify various decision topics, resolutions to the decision topics, and sentiments of stakeholders based on discussions or conversations occurring asynchronously in different groups and/or channels, and/or using different media or platforms. The identified decision topics, resolutions, and/or sentiments may be transformed into data that can be used to create and update a tracking document or page managed by a separate document management platform or collaboration platform. Various embodiments described herein may also improve a computer system in which messaging tools and services are collaborated with a document management system using a DDS, where no such collaboration exists between the messaging tools and services and the document management system for automatically documenting a decision and its related information in the document management system.

Various embodiments, variations, and alternatives thereof are discussed below with reference to FIGS. 1, 2, 3A-3C, 4A-4B, and 5-6. However, those skilled in the art will readily appreciate that the detailed description given herein with respect to these figures is for explanation only and should not be construed as limiting.

FIG. 1 depicts an example network of computer systems in, or over which, embodiments as described herein may be implemented. As shown in FIG. 1, a network of computer systems 100 may include a communication service 132, which may further include a messaging service 134. The communication service 132 may be implemented as a hosted service in a hosted environment for providing various messaging services and/or messaging tools. For example, the messaging service 134 may be implemented as a real-time chat messaging service in which participant users are able to exchange messages in a chat room, chat channel, or similar chat-based service in which the messaging functionality is the primary or main service offered by the communication service 132 or platform. Additionally, or alternatively, the communication service 132 may provide other communication services that are in addition to the messaging service 134. For example, the communication service 132 may provide a video conference service, a streaming video service, a document management service, an issue tracking service, or other type of service that may be supplemental to the messaging service 134 and, in some cases, may be the primary service provided by the communication service 132. By way of a non-limiting example, the messaging service 134 may allow various users of the messaging service 134 to send one or more messages to other users or participants of the messaging service 134 and receive one or more messages from the other users of the messaging service 134 via a network 136.

In some embodiments, and by way of a non-limiting example, the messaging service 134 may also enable users of the messaging service 134 to form or create a channel including particular users, and/or one or messaging sessions including a group of specific users of the messaging service 134 as participant users. A message posted by a participant user in the channel and/or the one or more messaging sessions may be displayed on a client device of each participant user of the channel and/or the one or more messaging sessions.

In FIG. 1, a client device A 102, a client device B 108, and a client device C 116 are shown. Each client device may be associated with a user or chat participant (e.g., user 1, user 2, and user 3, respectively). Each of the user 1, the user 2, and the user 3 may be members of a team, and working on the same project. Each user of the user 1, the user 2, and the user 3 may have a client application (e.g., a chat application or other communication service client application) executing on a respective client device. For example, the client device A 102 of the user 1 may have a chat application 104 executing on the client device A 102. The client device B 108 of the user 2 may have a chat application 110 executing on the client device B 108, and the client device C 116 of the user 3 may have a chat application 120 executing on the client device C 116.

In some embodiments, the chat application 104 may be a different version from the chat application 110 and/or the chat application 120. Further, the chat application 104 may be executing on a different type of operating system or platform than the chat application 110 and/or the chat application 120. By way of a non-limiting example, a version of the chat application 104 may include and/or support different features than a version of the chat application 110 and/or the chat application 120. For example, a version of the chat application 104 may not support a plugin, but a version of the chat application 110 and a version of the chat application 120 may support a plugin 112 and a plugin 122, respectively, as described herein, in accordance with some embodiments.

In some embodiments, and by way of a non-limiting example, the plugin 112 or 122 may perform one or more functions of the DDS 130 on the client device, as described herein, in accordance with some embodiments. That is, the plugin 112 or 122 may be configured to extract messages from the chat application, obtain additional context information associated with a chat session, obtain context information related to the respective client device, and analyze or transform the extracted data and interface with the hosted services 124 in order to cause creation of, for example, a tracking document (or also referred herein as a decision document).

In one example, participant users of a channel may discuss a particular project by posting one or more messages in the channel. For example, a first participant user of a channel may post a message using a chat application instance executing on a client device of the first participant user. The message posted by the first participant user in the channel may be displayed on a client device of each of the other participant users of the channel using an instance of a chat application executing on their client devices. A second participant user may then post another message using a chat application instance on a client device of the second participant user. Thus, multiple messages posted by the participant users in the channel may form one or more messaging sessions among the participant users. Content of messages in the channel and/or the one or more messaging sessions may include one or more decision topics, one or more resolutions proposed by one or more participant users, feedback from the one or more participant users, and so on. Feedback (or sentiment) of the one or more participant users may expressed be by the one or more participant users in textual form (e.g., using a statement or words), and/or in non-textual form (e.g., using an icon or emoji displaying like, dislike, support, opposition, and so on). An example messaging between participant users in a channel and/or in one or more messaging sessions is discussed below in FIG. 3A, FIG. 3B, and/or FIG. 3C in which the messaging service 134 may act as a backend service or a backend application facilitating the messaging among the participant users in a channel and/or in one or more messaging sessions.

In some embodiments, the messaging service 134 may create a channel identifier and/or an identifier associated with each of one or more messaging sessions of a channel in which one or more messages may be exchanged by participant users. In some embodiments, by way of a non-limiting example, the messaging service 134 may generate a transcript including one or more messages exchanged in a channel and/or one or more messaging sessions of a channel by participant users.

In some embodiments, the communication service 132 and/or messaging service 134 may periodically transmit a channel identifier, an identifier associated with each of one or more messaging sessions of a channel, and/or one or more messages exchanged by one or more participant users of a channel in the channel and/or the one or more messaging sessions to a decision documenting service (DDS) 130. By way of a non-limiting example, the communication service 132 and/or messaging service 134 may transmit the channel identifier, the identifier associated with each of the one or more messaging sessions, and/or one or more messages for all channels for which the messaging service 134 acts as a backend application.

In some embodiments, and by way of a non-limiting example, a channel may include configuration settings to transmit a channel identifier, an identifier associated with each of the one or more messaging sessions, and/or one or more messages exchanged in the channel and/or one or more messaging sessions to the DDS 130. In one example, one or more messages exchanged in the channel in one or more messaging sessions may be included in a transcript, and thus a transcript may include a set of messages exchanged in a channel and/or one or more messaging sessions by participant users. The transcript may be sent by the communication service 132 and/or messaging service 134 to the DDS 130 with a corresponding channel identifier.

In some embodiments, the DDS 130 may invoke an application programming interface (API) call to receive one or more channel identifiers, one or more identifiers of one or more messaging sessions of one or more channels, one or more messages exchanged in a channel and/or one or more messaging sessions, and/or one or more transcripts. The API call from the DDS 130 may be sent to the communication service 132, the messaging service 134, a frontend application (e.g., a chat application) executing on a client device, and/or a plugin of a frontend application (e.g., a chat application) executing on a client device. The DDS 130 may specify a time period in the API call for which the DDS 130 is requesting one or more channel identifiers, one or more identifiers of one or more messaging sessions of one or more channels, one or more messages exchanged in a channel and/or one or more messaging sessions, and/or one or more transcripts.

In one example, the DDS 130 may specify the last time when the one or more channel identifiers, one or more identifiers of one or more messaging sessions of one or more channels, one or more messages exchanged in a channel and/or one or more messaging sessions, and/or one or more transcripts to receive information were requested by the DDS 130 in an API call, as described herein.

The communication service 132, the messaging service 134, a frontend application executing on a client device, and/or a plugin of a frontend application executing on a client device may provide the one or more channel identifiers, one or more identifiers of one or more messaging sessions of one or more channels, one or more messages exchanged in a channel and/or one or more messaging sessions, and/or one or more transcripts to the DDS 130 in an API response message.

In some embodiments, the API call and/or the API response message may be implemented using a webservice (such as a representational state transfer (REST)), the one or more channel identifiers, one or more identifiers of one or more messaging sessions of one or more channels, one or more messages exchanged in a channel and/or one or more messaging sessions, and/or one or more transcripts may be communicated to the DDS 130 as a webservice payload, a JavaScript Object Notation (JSON) object, a hyper-text markup language (html) payload, and/or a mutually agreed proprietary object.

The DDS 130 may also communicate with an issue tracking service 126 and/or a document management service 128 using an interface defined for communication between the DDS 130 and the issue tracking service 126 and/or document management service 128. The document management service 128 may manage and store documents as digital content for one or more projects in a database (not shown). The documents stored as digital content may include, but are not limited to, one or more webpages, one or more images, and/or one or more videos associated with one or more projects. The issue tracking service 126 may manage one or more issues (e.g., trouble tickets) associated with one or more projects, where the one or more issues may be stored in a database (not shown).

As described herein, in some embodiments, and by way of a non-limiting example, a DDS may retrieve a set of messages associated with one or more messaging sessions of a channel and/or a channel via an API request and response. In one example, a DDS may receive a set of messages exchanged in one or more messaging sessions of a channel and/or a channel by subscribing to receive the set of messages from a communication service, a messaging service, a frontend application executing on a client device, and/or a plugin of a frontend application executing on a client device. According to the subscription by the DDS, a set of messages associated with one or more messaging sessions of a channel, or a channel, may be notified of the DDS periodically and/or according to a time period specified in a subscription request.

As described herein, a DDS may analyze content of the received set of messages using a natural language parsing (NLP) model. As described herein, the set of messages may include content in which participant users may discuss a decision topic, one or more resolutions to the discuss topic, pros and cons for a resolution to a decision topic, sentiment of a participant user describing a like, a dislike, a favor, an oppositional, and/or a neutral viewpoint of the participant user, and so on. The NLP model may use a database or set of keywords, phrases, and/or one or more sequences of keywords or phrases to analyze the content of the received set of messages. The database or set of keywords, phrases, and/or the one or more sequences of keywords or phrases may identify words, phrases, and/or sequence of words used to describe a proposal for a decision topic, a resolution to a decision topic, pros and cons for a resolution to a decision topic, and/or sentiment of a participant user describing a like, a dislike, a favor, an oppositional, and/or a neutral viewpoint of the participant user, and so on. The NLP model may analyze one or more messages of the received set of messages to identify a pattern of a decision topic, one or more resolutions, pros and cons for a resolution to a decision topic, and/or sentiment of a participant user describing a like, a dislike, a favor, an oppositional, and/or a neutral viewpoint of the participant user, and so on, and assign a confidence score based on a machine learning model. If the confidence score meets a user-specified threshold level, then the DDS may store relevant information from the received set of messages as database content items in a database.

As described herein, in some embodiments, and by way of a non-limiting example, the relevant information from the received set of messages may include a channel identifier, an identifier associated with each of one or more messaging sessions, a decision topic, one or more resolutions to the decision topic, pros and cons for the resolutions to the decision topic, and/or the sentiment of a participant user, date and/or timestamp corresponding to the one or more messaging sessions, a list of participant users, a list of contributors (of a decision topic, a resolution, name and/or identification of a participant user, pros and cons of a resolution, and/or sentiment), statistical information corresponding to a resolution (e.g., a number of participant users in favor of a resolution, a number of participant users in opposition of a resolution, a number of participant users having a neutral view), and/or a name and/or identification of a project, and so on.

In some embodiments, and by way of a non-limiting example, the DDS may trigger a document management service to create and/or update a document or webpage (e.g., a decision document/tracking document) based on the relevant information stored in the database as database content items by the DDS. The document management service may create and/or update the tracking document according to a specific template for the tracking document. The specific template may be a default template identifying organization of the tracking document, or may be a user-specified template. In the present disclosure, two different templates of a tracking document are described using FIG. 4A and FIG. 4B.

In some embodiments, based on the analysis of the one or more messages of the received set of messages and/or one or more transcripts associated with each of the one or more messaging sessions received, for example, from the communication service 132, documents managed and stored by the document management service 128, and/or issues managed and stored by the issue tracking service 126, the DDS 130 may identify a particular decision topic, and an author of the decision topic (e.g., a participant user in one or more messaging sessions who proposed the particular decision topic). The DDS 130 may also identify sentiments of a participant user in one or more messaging sessions using a natural language processing (NLP) model and/or a set of signaling words, phrases, and/or symbols (described in detail below). The sentiments of a participant user in one or more messaging sessions include likes, dislikes, statements in support and/or opposition of the decision topic, and/or one or more resolutions proposed for the decision topic. In one example, sentiments of a particular user may also include a participant user's feedback on a webpage or a document created, updated, managed, and/or stored by a document management service, and/or an issue tracking service.

In some embodiments, the DDS 130 may invoke an API call to the document management service 128 causing generation of a document page associated with a project corresponding to a decision topic based on the one or more data content items storing the decision topic and related information, as described herein. In some embodiments, the DDS 130 may invoke an API call to the issue tracking service 126 to automatically generate an issue based on the one or more data content items storing the decision topic and related information, as described herein. By way of a non-limiting example, the DDS 130 may automatically populate details of the issue, such as a title of the issue, description of the issue, a user or a group responsible to provide solution for the issue, one or more target dates for the solution, one or more related documents/references as a link or an attachment to the generated issue, and so on.

As shown in FIG. 1, in addition to a chat application executing on a client device, one or more other frontend applications (e.g., client applications) may also be executing on the client device. For example, the client device A 102 may also be executing a frontend application for document management system 106 and a frontend application for issue tracking system 138. Similarly, the client device B 108 may be executing a frontend application for document management system 114 and a frontend application for issue tracking system 140, and the client device C 116 may be executing a frontend application for document management system 118 and a frontend application for issue tracking system 142. A user of a client device may create, view, and/or edit a document and/or a webpage managed and/or stored by the document management service 128 using a frontend application for the document management system. Similarly, a user of a client device may create, view, and/or edit an issue managed and/or stored by the issue tracking service 126 using a frontend application for the issue tracking system.

As shown in FIG. 1, the communication service 132, the messaging service 134, a document decision service 130, a document management service 128, an issue tracking service 126, hosted service 124, client device A 102, client device B 108, and/or client device C 116 may be communicatively coupled with each other via the network 136. The network 136 may be a local area network (LAN), a wide area network (WAN), an intranet, an Internet, a cellular network based on 3G, 4G, 5G, and/or 6G based communication technologies, and so on.

Accordingly, as described herein, the DDS 130 improves a computing network by providing an interface between the messaging service 134, the document management service 128, and the issue tracking service 126, and automatically generating one or more webpages detailing various decisions and related information based on a number of asynchronous messaging between users and one or more issues based on the various decisions and related information. Accordingly, the embodiments described herein may improve efficiency of stakeholders and/or an organization both in time and financial terms.

These foregoing embodiments depicted in FIG. 1 and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
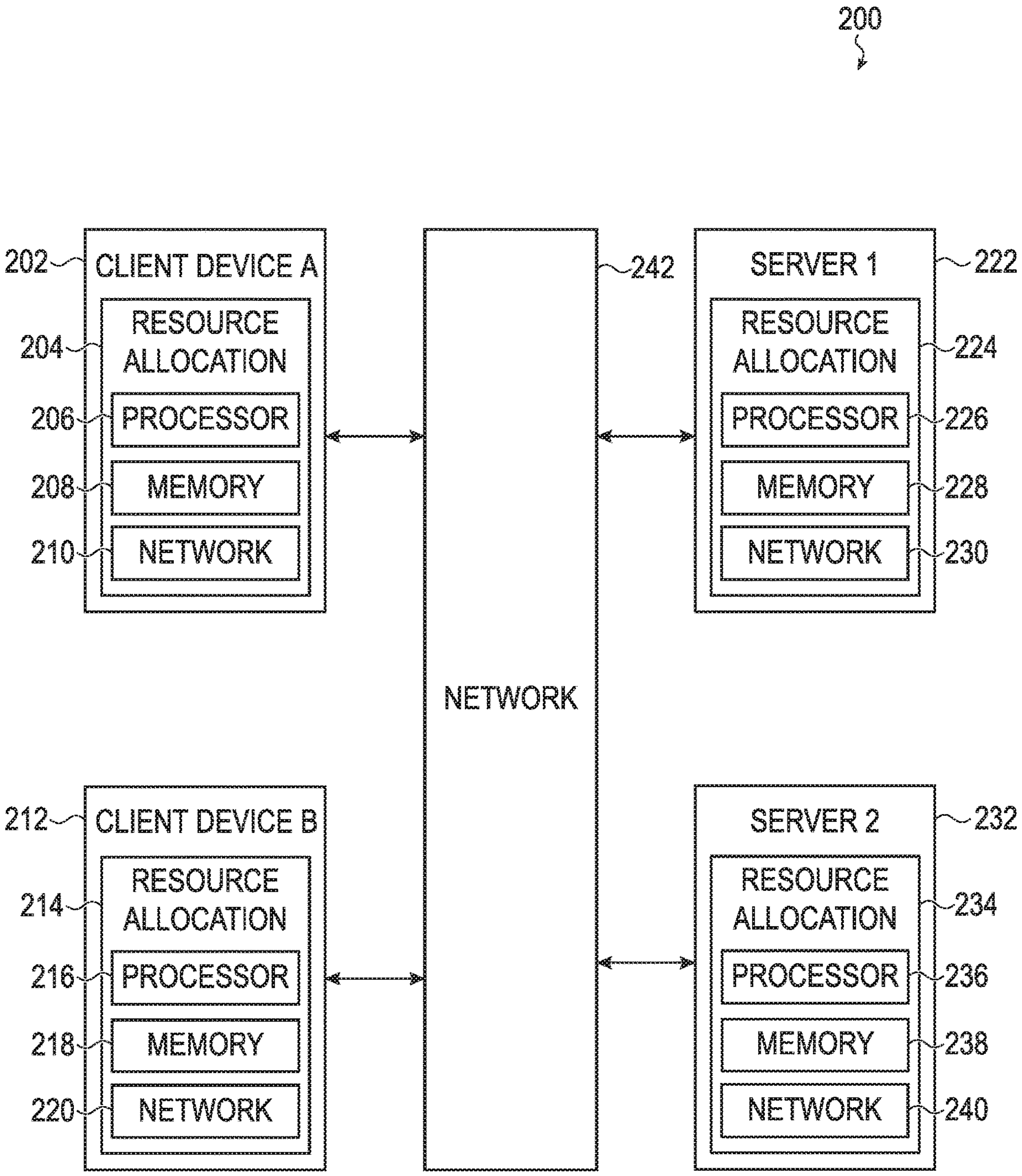
FIG. 2 depicts another example network of a computer systems, as described herein.

FIG. 2 depicts another example network of computer systems in, or over which, embodiments as described herein may be implemented. As shown in a network 200 of FIG. 2, a client device A 202 including one or more resource allocation modules 204, a client device B 212 including one or more resource allocation modules 214, a first backend server server1 222 including one or more resource allocation modules 224, and a second backend server server2 232 including one or more resource allocation modules 234 may be communicatively coupled with each other via a network 242. By way of a non-limiting example, the client device A 202 and/or the client device B 212 may be similar to the client device A 102, the client device B 108, and/or the client device C 116. The first backend server server1 222 and/or the second backend server server2 232 may be hosting services such as the communication service 132, the messaging service 134, the document decision service 130, the document management service 128, and/or the issue tracking service 126 among other hosted services 124. The network 242 may be similar to the network 136 described herein.

In some embodiments, the network shown in FIG. 2 may, for example, be an intra organization network, or multiple organization networks connected with each other via the network 242. The client device A 202 or the client device B 212 may be a workstation, a computer, a laptop, a tablet, and/or another suitable client device. The client device A 202 or the client device B 212 may be implemented as hardware or as a virtual machine. The one or more resource allocation modules 204 or 214 may allocate resources, including but not limited to, a processor or a computational resource 206 or 216, a memory 208 or 218, network usage or bandwidth 210 or 220, and so on, as required by the client device A 202 or the client device B 212. The client device A 202 or the client device B 212 may be executing one or more applications ("client applications") which may be frontend applications referenced herein. In some cases, there may be more than one instance of a frontend application executing on the client device A 202 or the client device B 212.

The first backend server server1 222 and the second backend server server2 232 may be an application server, and/or an instance of a server. The first backend server server1 222 and/or the second backend server server2 232 may be implemented as hardware or as a virtual machine. The first backend server server1 222 and the second backend server server2 232 each may be running an application or a service (e.g., a server application) which may be a backend application or service, referenced herein. In some cases, there may be more than one instance of the backend application running on each of the first backend server server1 222 and/or the second backend server server2 232. The one or more resource allocation modules 224 and/or 234 may allocate resources, including but not limited to, a processor or a computational resource 226 and/or 236, a memory 228 and/or 238, network usage or bandwidth 230 and/or 240, and so on, as required by the first backend server server1 222 and/or the second backend server server2 232.

In some cases, the client devices 202 and/or 212, the first backend server server1 222, and/or the second backend server server2 232 may be a microservice, an executable code, a JavaScript, a library, a JAR file, and so on.

The client device A 202 or the client device B 212 may include a processor and a memory. The processor may be any suitable computing device or logical circuit configured to execute one or more instructions to perform or coordinate one or more operations on or to digital data. In many embodiments, the processor or processors of the client device A 202 or the client device B 212 may be a physical processor, although this is not required of all embodiments; virtual components may be suitable in some implementations. Similarly, a memory of the client device A 202 or the client device B 212 may be configured and/or implemented in a number of suitable ways and may be partially or completely virtualized.

In some embodiments, the processor of the client device A 202 or the client device B 212 is configured to access at least one executable asset from the memory of the client device A 202 or the client device B 212. More particularly, the processor of the client device A 202 or the client device B 212 may be configured to access a data store portion of the memory to load, into a working portion of the memory, at least one executable asset or executable program instruction. In response to loading the instruction or executable asset into working memory, the processor of the client device A 202 or the client device B 212 may instantiate an instance of software referred to herein as a client application.

In many embodiments, a client application (also referred herein as a "frontend application") may be configured to provide client-side functionality of a software platform (a documentation or content creation service, messaging tools or services, or other collaboration platform). More specifically, the client application may be configured to communicably couple to a separate instance of software executing on, and/or instantiated by, a host system or server configured to provide server-side ("backend") functionality of the hosted platform services, for example, the first backend server server1 222 providing an issue tracking service 126, a document management service 128, and/or a decision documenting service 130, and/or the second backend server server2 232 providing communication services 132 including a messaging service 134.

In this example, the first backend server server1 222 and/or the second backend server server2 232 may include a host server supporting the backend configured to operate within, or as, a virtual computing environment that is supported by one or more physical servers including one or more hardware resources such as, but not limited to (or requiring), one or more of: a processor allocation; a memory allocation (also referred to as a working memory); non-volatile storage (also referred to as persistent memory); networking connections; and the like.

Further, it may be appreciated that although referred to as a singular "server", a host server supporting the backend may be a cluster of different computing resources, which may be geographically separated from one another. In this manner, because specific implementations may vary, both the host server (of the first backend server server1 222 and the second backend server server2 232) and the client device A 202 or the client device B 212 can be referred to, simply, as "computing resources" configured to execute purpose-configured software (e.g., the frontend and the backend).

As used herein, the general term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

These foregoing embodiments depicted in FIG. 2 and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3A:
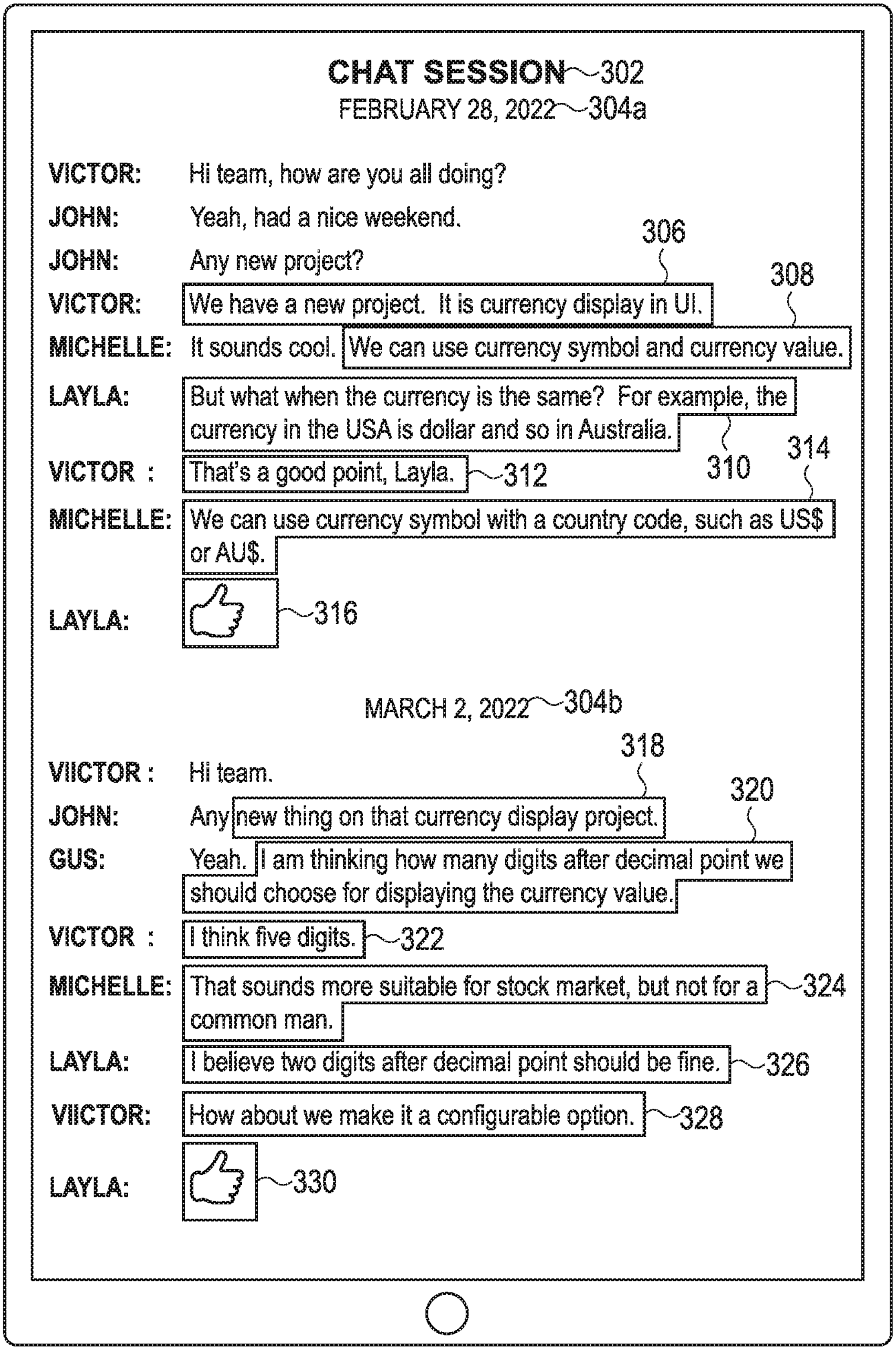
FIGS. 3A-3C each depicts an example messaging among participant users based on which a tracking document is automatically generated, in accordance with some embodiments.
Figure 3B:
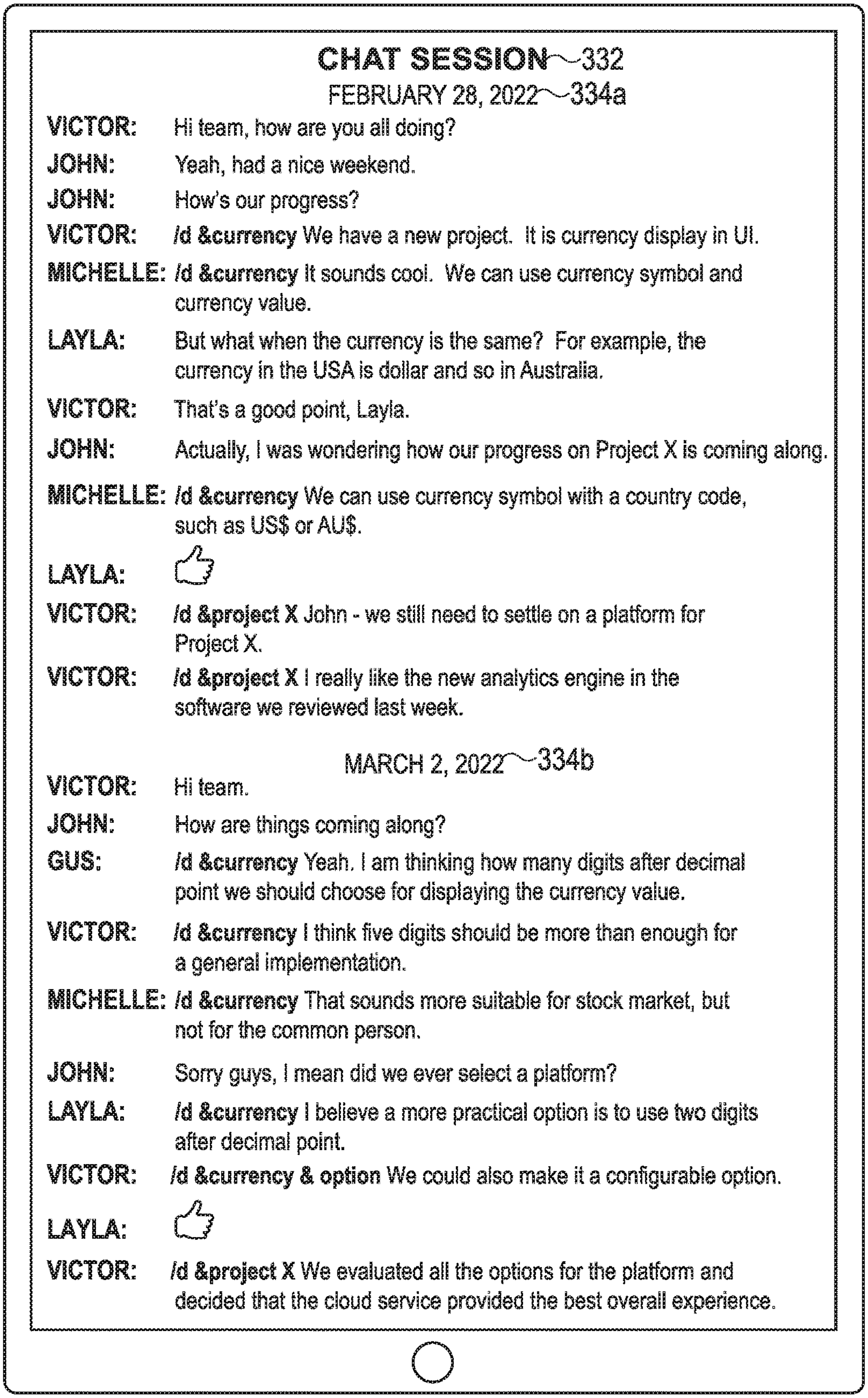
Figure 3C:
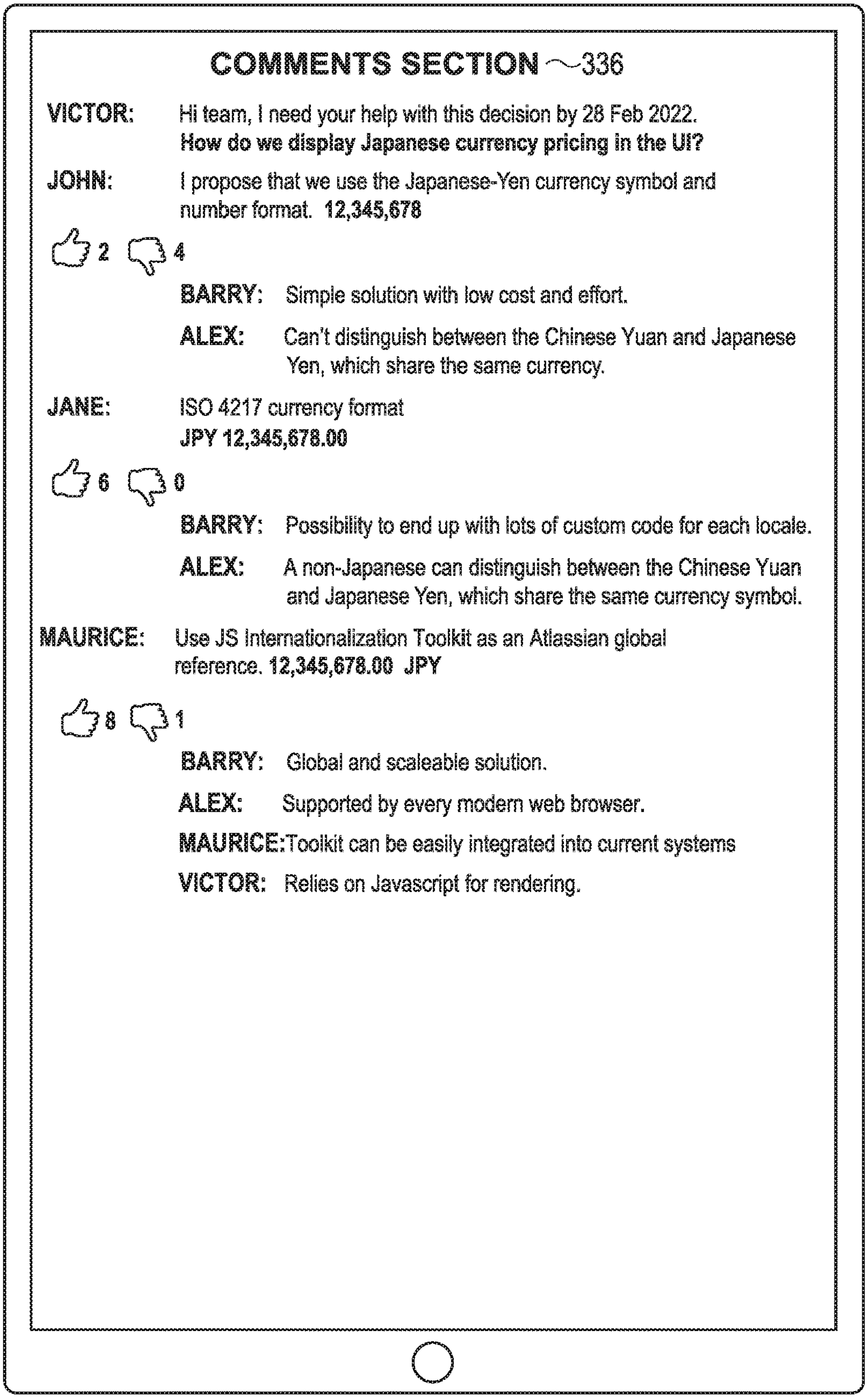

FIGS. 3A-3C each depicts an example messaging exchange among participants for which a tracking document is automatically generated, in accordance with some embodiments. As shown in FIG. 3A, a chat session 302 on a client device, such as a client device A 102, is shown. The chat session 302 may include messaging among group members on more than one occasions/dates. For example, the chat session 302 displays messaging among group members that occurred during a first chat session on a first date (e.g., Feb. 28, 2022) as 304*a*, and during a second chat session on a second date (e.g., Mar. 3, 2022) as 304*b*.

As shown in FIG. 3A, and by way of a non-limiting example, messaging among participant users during the first messaging session 304*a* suggests that members discussed a new project, for example, displaying a currency of different countries in a user interface (UI). Various group members proposed one or more resolutions to a decision to be made about how to display a currency of different countries in a UI shown as 306. For example, one user suggested to use a currency symbol and a currency value in the UI, as shown in FIG. 3A as 308. Another participant user expressed a concern that a use of a currency symbol may be confusing when a currency symbol is the same for a currency of two or more counties, as shown in FIG. 3A as 310. Another participant user expressed her support for the concern made by the other participant user, as shown in FIG. 3A as 312, while another participant user suggested that the currency symbol be displayed with a country code to avoid such confusion, as shown in FIG. 3A as 314. A participant user expressed her support using a thumbs up symbol 316 to the suggestion 314.

In some embodiments, a natural language processing model may be configured to parse one or more messages of a set of messages received by a DDS. Content of the one or more messages may be extracted and analyzed to identify a seminal message. A seminal message may include, for example, a particular decision topic for which a resolution is being sought. A set of keywords, phrases, a sequence of words, and so on, may be used to determine whether one or more messages are seminal messages including a decision topic. Other messages of the set of messages may be analyzed to identify one or more resolutions, pros and cons of a resolution, and a sentiment of a participant user (as described herein) corresponding to the identified particular decision topic using a set of keywords, phrases, a sequence of words, and so on. In some embodiments, and by way of a non-limiting example, content analyzed by the NLP model may also include non-textual content or a graphical element (such as an icon, an emoji, a picture, a video, and so on).

The content of each message may be parsed to identify one or more tokens. Each token may correspond to one or more words as used in a message. One or more tokens of a message and/or one or more messages may then be analyzed using a set of keywords, phrases, a sequence of words, and so on, to determine a decision topic, a resolution to a decision topic, pros and cons of the resolution, and/or a sentiment of a participant user (as described herein), and/or a corresponding confidence score. The confidence score may be evaluated against a user-specific threshold level to determine whether the one or more messages include a decision topic, a resolution to a decision topic, pros and cons of resolution, and/or sentiment of a participant user (as described herein), and so on.

In the present disclosure, the above-described functions of a DDS are explained using an assumed decision topic of how to display a currency in a UI being discussed in one or more messages exchanged by participant users in a channel and/or one or more messaging sessions of a channel. One or more resolutions, pros and cons for a resolution to a decision topic, a sentiment of a participant user describing a like, a dislike, a favor, an oppositional, and/or a neutral viewpoint of the participant user, and so on, may thus be analyzed with reference to the assumed decision topic.

As described herein, in accordance with some embodiments, one or more messages exchanged in a channel and/or one or more messaging sessions of a channel may be communicated, for example, by a messaging service or a communication service (such as the messaging service 134 or the communication service 132, as described using FIG. 1) to a DDS (such as the DDS 130, as described using FIG. 1), along with a channel identifier and/or an identifier of one or more messaging sessions of a channel. By way of a non-limiting example, the DDS may invoke an API call to receive one or more messages exchanged in a channel and/or one or more messaging sessions of a channel, as described herein. By way of a non-limiting example, the API call from the DDS may identify a channel identifier, and/or a time period corresponding to one or more messages exchanged in a channel, and/or one or more messaging sessions of a channel. The DDS may receive a set of messages including one or more messages exchanged in a channel and/or one or more messaging sessions of a channel as requested in the API call.

In some embodiments, the communication service and/or the messaging service may periodically send messages exchanged in a channel and/or one or more messaging sessions of a channel to the DDS along with a channel identifier, the identifier associated with each of one or more messaging sessions. In one example, messages exchanged in a channel and/or one or more messaging sessions of a channel may be transmitted to the DDS as a transcript. In some embodiments, the communication service and/or the messaging service may also transmit to the DDS any document that was posted or shared by a group chat member during the group chat session. The DDS may use a natural language processing model, as described herein, to analyze one or more messages, or a subset of messages to determine a decision topic, one or more resolutions for the decision topic, pros and cons of a resolution, and/or sentiments of one or more participant users, as described herein.

In some embodiments, as described herein, the DDS may also identify an author of a decision topic based on a user identification associated with a particular message in which a decision topic is mentioned. Similarly, one or more authors or contributors to one or more resolutions and/or sentiments may also be identified based on a user identification associated with a corresponding message analyzed by the DDS using the natural language processing model.

In some embodiments, the DDS may cause to generate and store one or more database content items (e.g., database records) to store information including a channel identifier, an identifier associated with each of one or more messaging sessions, a decision topic, one or more resolutions to the decision topic, pros and cons for the resolutions to the decision topic, and/or the sentiment of a participant user, a date and/or timestamp corresponding to the one or more messaging sessions, a list of participant users, a list of contributors (of a decision topic, a resolution, name and/or identification of a participant user, pros and cons of a resolution, and/or a sentiment), statistical information corresponding to a resolution (e.g., a number of participant users in favor of a resolution, a number of participant users in opposition of a resolution, a number of participant users having a neutral view), and/or a name and/or identification of a project, and so on, corresponding to one or more messaging sessions of a channel, e.g., a first messaging session 304*a* of a channel.

Further, as described herein, a decision for a project may be taken over a period of time in asynchronous messaging. Accordingly, one or more messages of the first messaging session 304*a* may be analyzed by the DDS. Based on analysis of the one or more messages by the DDS, for example, using an NLP model, as described herein, a decision topic, a resolution to a decision topic, pros and cons to a resolution, and sentiment of a user (as described herein) may be identified. Accordingly, the DDS may invoke another API call, for example, at a preconfigured or predetermined time interval, to receive one or more messages exchanged in the channel and/or during another messaging session of the channel, subsequent to the first messaging session 304*a*, for example, during a second messaging session 304*b*.

As shown in FIG. 3A as 318, participant users of a channel may further exchange messages related to, for example, an issue of displaying a currency of different countries in a UI. During the second messaging session 304*b*, for example, the participant users may further identify or decide on how many digits should be displayed after a decimal point, as shown in FIG. 3A as 320. One or more resolution proposals, for example, displaying up to five digits, two digits, and/or configurable, as shown in FIG. 3A as 322, 326, and/or 328, respectively, are proposed by participant users, and for which some participant users expressed their sentiments (as described herein), which is shown in FIG. 3A as 324 and 330.

An NLP model may use a set of keywords, phrases, and/or a sequence of words including, but not limited to, "new," "project," "issue," "decision," "use," "good point," "for example," "configurable," "option," and/or "believe," and so on to identify a decision topic, a resolution, pros and cons of a resolution, and/or sentiment of a participant user (as described herein). The NLP model may also use a non-textual form of expression such as an icon, an emoji (such as a thumbs up, a thumbs down, and so on) to identify the sentiment of a participant user (as described herein).

In some embodiments, and by way of a non-limiting example, the DDS may receive one or more messages of the second messaging session 304*b*, either as a result of invoking an API call by the DDS to the communication service and/or the messaging service, or periodic transmission from the communication service and/or the messaging service to the DDS, as described herein. The DDS may process one or more messages exchanged during the second messaging session 304*b* to identify one or more keywords, an identification of each participant of the messaging session, and so on. Based on the one or more keywords extracted from the one or messages, and/or based on the identification of each participant of the messaging session, the DDS may determine that the messaging session 304*b* includes one or more messages related to a decision topic of displaying a currency of different countries related to the messaging session 304*a*. The DDS may further identify whether a new decision topic is described in one or more messages exchanged during the second messaging session 304*b*, and one or more resolutions and/or sentiments for the new decision topic, along with other related information, as described herein, in accordance with some embodiments.

In some embodiments, the DDS may create, update, and store one or more database content items (e.g., database records) to store information including a channel identifier, an identifier associated with each of one or more messaging sessions, a decision topic, one or more resolutions to the decision topic, pros and cons for the resolutions to the decision topic, and/or the sentiment of a participant user, the date and/or timestamp corresponding to the one or more messaging sessions, a list of participant users, a list of contributors (of a decision topic, a resolution, name and/or identification of a participant user, pros and cons of a resolution, and/or a sentiment), statistical information corresponding to a resolution (e.g., a number of participant users in favor of a resolution, a number of participant users in opposition of a resolution, a number of participant users having a neutral view), and/or a name and/or identification of a project, and so on, based on processing of one or more messages and/or other documents corresponding to the one or more messaging sessions, for example, 304*a* and/or 304*b*. The DDS may also associate the one or more data content items associated with the first messaging session 304*a* with the one or more data content items associated with the second messaging session 304*b*, if determined to be related to each other, as described herein, in accordance with some embodiments.

In some embodiments, a database used for creating, updating, and storing the one or more database content items may be shared by more than one services (such as a DDS, a document management service, an issue tracking service, a communication service, and/or a messaging service, and so on). In one example, one or more database content items created, updated, and/or stored in a database by the DDS may be synchronized and/or replicated with another database used by other services (such as a document management service, an issue tracking service, a communication service, and/or a messaging service, and so on).

As described herein, one or more documents may also be shared during a messaging session. The one or more documents may be managed by a document management service (such as the document management service 128 described using FIG. 1). Thus, the DDS not only analyzes one or more messages exchanged in a messaging session but also analyzes one or more documents (e.g., digital content such as a webpage, a document, an image, a video, a transcript, and so on) to determine a decision topic, a resolution to the decision topic, and/or other things, as described herein, in accordance with some embodiments.

In some embodiments, and by way of a non-limiting example, the DDS may invoke an API call to transmit information including a channel identifier, an identifier associated with each of one or more messaging sessions, a decision topic, one or more resolutions to the decision topic, pros and cons for the resolutions to the decision topic, and/or the sentiment of a participant user, the date and/or timestamp corresponding to the one or more messaging sessions, a list of participant users, a list of contributors (of a decision topic, a resolution, name and/or identification of a participant user, pros and cons of a resolution, and/or a sentiment), statistical information corresponding to a resolution (e.g., a number of participant users in favor of a resolution, a number of participant users in opposition of a resolution, a number of participant users having a neutral view), and/or a name and/or identification of a project, and so on, based on processing of one or more messages and/or other documents corresponding to the one or more messaging sessions, for example, 304*a* and/or 304*b*, to a document management service to generate and/or update a tracking document (e.g., a webpage).

In some embodiments, the DDS may invoke an API call to cause the document management service to generate and/or update a webpage to describe the decision topic, the resolution, and/or the sentiment, and/or an API call to cause the issue tracking service to create and/or update an issue based on the identified decision topic, resolution, and/or sentiment, as described herein.

The document management service may create and/or update the tracking document according to a specific template for the tracking document. The specific template may be a default template identifying organization of the tracking document, or may be a user-specified template. In the present disclosure, two different templates of a tracking document are described using FIG. 4A and FIG. 4B. The document management service may create and/or update the tracking document based on one or more data content items, or an API call, including information, such as a channel identifier, an identifier associated with each of one or more messaging sessions, a decision topic, one or more resolutions to the decision topic, pros and cons for the resolutions to the decision topic, and/or the sentiment of a participant user, the date and/or timestamp corresponding to the one or more messaging sessions, a list of participant users, a list of contributors (of a decision topic, a resolution, a name and/or identification of a participant user, pros and cons of a resolution, and/or a sentiment), statistical information corresponding to a resolution (e.g., a number of participant users in favor of a resolution, a number of participant users in opposition of a resolution, a number of participant users having a neutral view), and/or a name and/or identification of a project, and so on.

The issue tracking service may create and/or update an issue based on one or more data content items, or an API call, including information, such as a channel identifier, an identifier associated with each of one or more messaging sessions, a decision topic, one or more resolutions to the decision topic, pros and cons for the resolutions to the decision topic, and/or the sentiment of a participant user, the date and/or timestamp corresponding to the one or more messaging sessions, a list of participant users, a list of contributors (of a decision topic, a resolution, a name and/or identification of a participant user, pros and cons of a resolution, and/or a sentiment), statistical information corresponding to a resolution (e.g., a number of participant users in favor of a resolution, a number of participant users in opposition of a resolution, a number of participant users having a neutral view), and/or a name and/or identification of a project, and so on.

FIG. 3B illustrates another example of one or more group chat sessions among participant users, in accordance with some embodiments. As shown in FIG. 3B, a chat session 332 on a client device, such as a client device A 102, is shown. The chat session 332 may include messaging among participant users on more than one occasions/dates. For example, the chat session 332 displays messaging among participant users that occurred during a first messaging session on a first date (e.g., Feb. 28, 2022) as 334*a*, and during a second messaging session on a second date (e.g., Mar. 3, 2022) as 334*b*.

As shown in FIG. 3B, and by way of a non-limiting example, one or more messages exchanged during a first messaging session 334*a* may be analyzed using an NLP model, as described herein in accordance with some embodiments. Example messages shown in FIG. 3B describes how a DDS may identify more than one decision topic, each associated with a different project, in a single messaging session. For example, messages exchanged during the first messaging session 334*a* may suggest that participant users discussed at least two new projects, for example, displaying a currency of different countries in a user interface (UI) and deciding a platform to be used for a project X. Various participant users proposed one or more resolutions to a decision to be made about how to display a currency of different countries in a UI as shown in FIG. 3B.

For example, one participant user suggested to use a currency symbol and a currency value in the UI, as shown in FIG. 3B. Another participant user expressed a concern that a use of a currency symbol may be confusing when a currency symbol is the same for a currency of two or more counties, as shown in FIG. 3B. Another participant user expressed her support for the concern made by the other group member, while another participant user suggested that the currency symbol be displayed with a country code to avoid such confusion, as shown in FIG. 3B. A participant user expressed her support using a thumbs up symbol. Further, during the same first chat session 334*a*, the participant users also discussed another issue, for example, deciding a platform to be used for project X.

While a natural language processing model is used for analyzing one or more messages of a group chat session, as described with reference to FIG. 3A, a participant member may explicitly identify which message includes a particular decision topic, a resolution on the particular decision topic, and/or a sentiment on the decision topic and/or the resolution. The group chat member may type a specific keyword, such as /d, to invoke processing of a message to identify a decision topic, a resolution, and/or a sentiment, or select an icon shown in a chat application. As shown in FIG. 3B, a keyword may be specified prefixed by a symbol, for example, &, to designate a specific project corresponding to a decision topic, a resolution, and/or a sentiment. As shown in FIG. 3B, keywords currency and project X are used to identify specific projects.

In some embodiments, a natural language processing model may be configured to parse one or more messages that include the specific keyword, such as /d, to invoke a DDS (e.g., the DDS 130), which further identifies a decision topic (e.g., how to display a currency in a UI), one or more resolutions (e.g., use a currency symbol and value, use a currency symbol with a country code), and a sentiment of one or more participant users. As shown in FIG. 3B, the sentiment of one or more participant users may include, but is not limited, to likes, dislikes, a statement in support of the decision topic and/or one or more resolutions, a statement showing concern to the decision topic and/or one or more resolutions. The sentiment may be expressed by one or more users using phrases, specific words, icons, emojis, and so on.

In some embodiments, and by way of a non-limiting example, a participant user may also include a specific label in a message posted in a channel and/or one or more messaging sessions of a channel to identify a project or a particular decision topic. For example, as shown in FIG. 3B, a specific label may include a symbol followed by a project or decision topic name, such as "& currency," "& project X." Any other symbol, such as #, may also be used in place of &.

Since receiving of one or more messages of a channel and/or one or more messaging sessions of a channel by a DDS is described in the present disclosure in detail, in accordance with some embodiments, these details are not repeated again for brevity.

In some embodiments, and by way of a non-limiting example, a communication service and/or a messaging service may only communicate messages that include the specific keyword that invokes a DDS, such as /d, to the DDS when requested by the DDS by invoking an API call, or sent by the communication service and/or the messaging service during periodic transmission of one or more messages exchanged in a channel and/or one or more messaging sessions of a channel to the DDS.

In some embodiments, as described herein, the DDS may identify an author of a decision topic based on a user identification associated with a particular message in which a decision topic is mentioned. Similarly, one or more authors or contributors to one or more resolutions and/or sentiments may also be identified based on a user identification associated with a corresponding message analyzed by the DDS using the natural language processing model.

In some embodiments, the DDS may cause to generate and store one or more database content items (e.g., database records) to store information including a channel identifier, an identifier associated with each of one or more messaging sessions, a decision topic, one or more resolutions to the decision topic, pros and cons for the resolutions to the decision topic, and/or the sentiment of a participant user, a date and/or timestamp corresponding to the one or more messaging sessions, a list of participant users, a list of contributors (of a decision topic, a resolution, a name and/or identification of a participant user, pros and cons of a resolution, and/or a sentiment), statistical information corresponding to a resolution (e.g., a number of participant users in favor of a resolution, a number of participant users in opposition of a resolution, a number of participant users having a neutral view), and/or a name and/or identification of a project, and so on, for each project and/or particular decision topic (e.g., currency, project X) corresponding the messaging session 334*a* of a channel.

Further, as described herein, a decision for a project may occur over a period of time in asynchronous messaging. Accordingly, during a second messaging session 334*b*, participant users may further discuss an issue of displaying a currency of different countries in a UI, as shown in FIG. 3B. During the second messaging session 334*b*, for example, the participant users may further identify or decide on how many digits should be displayed after a decimal point, as shown in FIG. 3B One or more resolution proposals, for example, displaying up to five digits, two digits, and/or making it as a configurable option, are proposed by group members, while some group members expressed their sentiments, as shown in FIG. 3B. Also, a resolution is made for project X to use cloud service is also made, as shown in FIG. 3B.

As shown in FIG. 3B, during the second messaging session 334*b*, a specific keyword, such as /d, may be specified by a group member in a message to process that message by the DDS, as described herein, in accordance with some embodiments. Other keywords may also be used, for example, &pros and &cons, to identify pros and cons of various resolutions.

In some embodiments, and by way of a non-limiting example, the DDS may process one or more messages exchanged during the second messaging session 334*b* to identify, create a new set of database content items, and/or update one or more database content items created based on processing of one or more messages of the first messaging session 334*a*. The DDS may also associate the one or more data content items associated with the first messaging session 334*a* with the one or more data content items associated with the second messaging session 334*b*, if determined to be related to each other, as described herein, in accordance with some embodiments.

As described herein, in some embodiments, one or more documents may also be shared during a messaging session. The one or more documents may be managed by a document management service (such as the document management service 128). Thus, the DDS may not only analyze one or more messages exchanged in a messaging session but may also analyze one or more documents (e.g., digital content such as a webpage, a document, an image, a video, a transcript, and so on) to determine a decision topic, a resolution to the decision topic, and/or a sentiment.

In some embodiments, the DDS may invoke an API call to cause the document management service to generate and/or update a webpage to describe the decision topic, the resolution, and/or other related information, and/or an API call to cause an issue tracking service (e.g., the issue tracking service 126) to create and/or update an issue based on the identified decision topic, resolution, and/or other related information corresponding to the first and second messaging sessions 334*a* and 334*b*, as described herein.

FIG. 3C illustrates another example processing by a DDS, in accordance with some embodiments. As shown in FIG. 3C, a comment section 336 may be a webpage or a document managed by a document management service (such as the document management service 128) and displayed on a client device, such as the client device A 102. The comments section 336 may include messages posted by one or more users of a document management service on one or more occasions/dates. The comments section 336 displays statistics related to sentiment (as described herein) of the one or more users of the document management service. A DDS (e.g., the DDS 130) may process content extracted from the webpage in a similar way, as described herein in accordance with some embodiments, to identify a decision topic, a resolution, pros and cons of a resolution, and/or other related information. Accordingly, processing of the content extracted from the webpage is not repeated again for brevity.

As shown in FIG. 3C, hierarchy of content extracted from the webpage may be considered to identify an association between comments from a number of users of a document management service. In one example, as shown in FIG. 3C, hierarchy of the content extracted from the webpage may be determined based on indention of each comment from a number of users of a document management service. The DDS may periodically access the webpage to analyze new content posted on the document. In one example, the DDS may subscribe to receive new content whenever the document is updated.

These foregoing embodiments depicted in FIGS. 3A-3C and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4A:
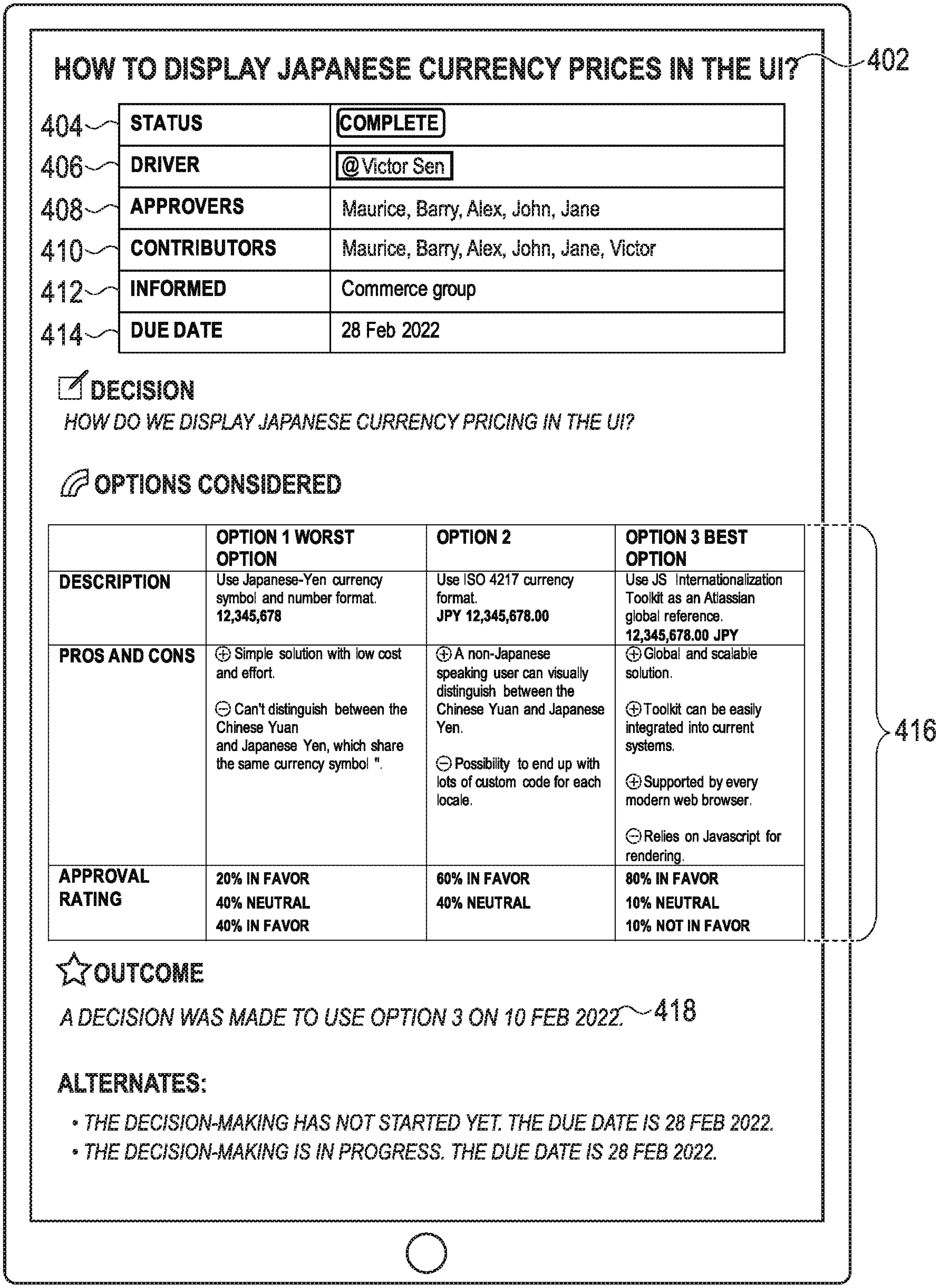
FIGS. 4A-4B each depicts an example tracking document that is automatically generated on a document management system, in accordance with some embodiments.
Figure 4B:
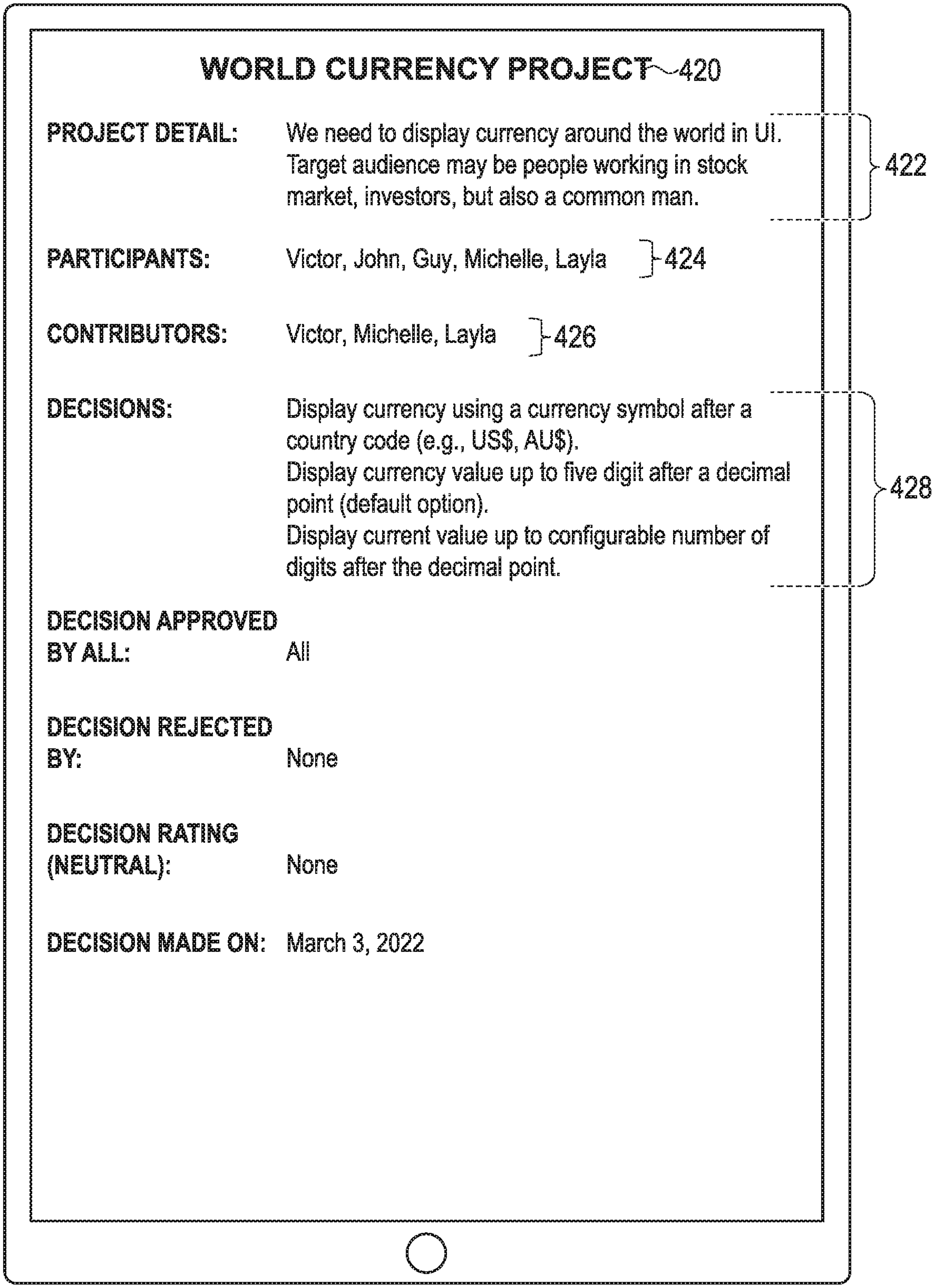

FIGS. 4A-4B each depicts an example tracking document that is automatically generated by a document management system, in accordance with some embodiments. A document page generated by a document management service (e.g., the document management service 128) is shown in FIG. 4A. The document page shown in FIG. 4A may be generated based on one or more database content items generated and/or updated by a DDS (e.g., the DDS 130). As shown in FIG. 4A, the document page generated by the document management service 128 may include a title of a page or a project 402, a status of the project 404, a driver or a leader of the project 406, a list of approvers of a decision 408, a list of contributors 410, one or more groups or teams 412 related or impacted by the decision, and/or one or more dates 414 associated with a project.

The document shown in FIG. 4A may also include a table (or a decision metric) 416 describing one or more resolutions proposed by one or more contributors listed in the list of contributors 410, sentiments of one or more participant users for the one or more resolutions, and/or statistics corresponding to the one or more resolutions. As described herein, the description corresponding to the one or more resolutions, and/or the sentiments of one or more participant users may be identified by the DDS by analyzing one or more messages of a messaging session and/or content managed by the document management service, and stored in the one or more database content items. Statistics corresponding to the one or more resolutions may be determined by the document management service while generating the document shown in FIG. 4A, or may be stored in a database as database content items.

In some embodiments, and by way of a non-limiting example, the DDS and/or the document management service may assign a ranking order to each resolution based on an analysis of sentiments of the stakeholders, and store the assigned ranking order in one or more database content items. In some examples, an opted solution may be suggested and/or recommended by the DDS and/or the document management service may be based on the ranking order and/or sentiment expressed by a particular group of users.

By way of a non-limiting example, in some embodiments, a document page generated by the document management service may also include an opted solution 418 as selected by approvers of the decision listed in the list of approvers of a decision 408, and/or determined automatically based on statistics corresponding to the one or more resolutions. Other information related to a decision and/or one or more resolutions may also be displayed.

In some embodiments, the document management service may create and/or update the tracking document according to a specific template for the tracking document. The specific template may be a default template identifying organization of the tracking document, or may be a user-specified template. In some embodiments, a template identifying a format of the tracking document may be communicated to a document management service, for example, by a DDS. The format may specify a location corresponding to one or more a channel identifier, an identifier associated with each of one or more messaging sessions, a decision topic, one or more resolutions to the decision topic, pros and cons for the resolutions to the decision topic, and/or the sentiment of a participant user, a date and/or timestamp corresponding to the one or more messaging sessions, a list of participant users, a list of contributors (of a decision topic, a resolution, a name and/or identification of a participant user, pros and cons of a resolution, and/or a sentiment), statistical information corresponding to a resolution (e.g., a number of participant users in favor of a resolution, a number of participant users in opposition of a resolution, a number of participant users having a neutral view), and/or a name and/or identification of a project, and so on.

The document page generated by the document management service 128 may be displayed on a client device when a user requests to view the document page, and/or a related project page is requested by a user.

FIG. 4B depicts another example tracking document that is automatically generated by a document management system, in accordance with some embodiments. A document page generated by a document management service 128 is shown in FIG. 4B. The document page shown in FIG. 4B may be generated based on one or more database content items generated and/or updated by a DDS (e.g., the DDS 130). As shown in FIG. 4B, the document page generated by a document management service (e.g., the document management service 128) may include a title of a page or a project 420, project details 422 providing a brief summary of the project, a list of participants 424 during one or more group chat sessions, a list of contributors 426, one or more decisions or resolutions 428, an opted solution, and/or statistics corresponding to the one or more decisions.

The document shown in FIG. 4B may be generated based on one or more database content items created and/or updated by the DDS, as described herein, in accordance with some embodiments. Other information related to a decision and/or one or more resolutions may also be displayed in the document shown in FIG. 4B. The document page generated by the document management service may be displayed on a client device when a user requests to view the document page, and/or a related project page is requested by a user.

These foregoing embodiments depicted in FIGS. 4A-4B and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5:
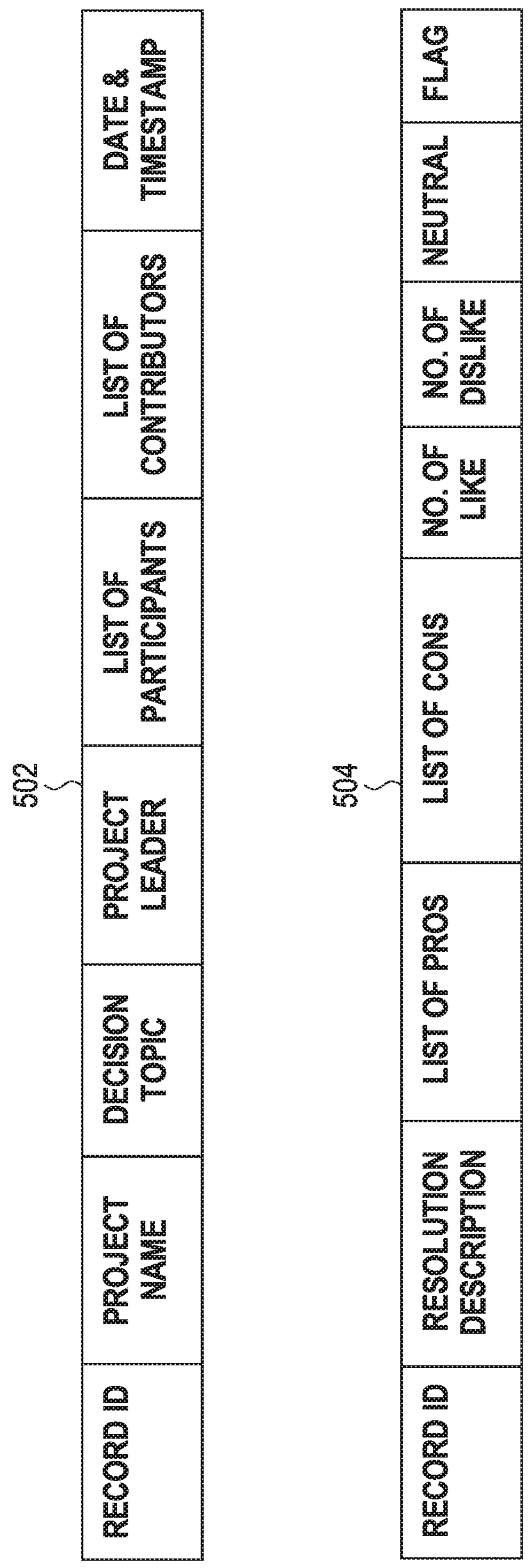
FIG. 5 depicts an example of database table schemas for storing decision related content from online messaging tools and services, in accordance with some embodiments.

FIG. 5 is an example of database table schemas for storing decision related content from online messaging tools and services, in accordance with some embodiments. As shown in FIG. 5, in some embodiments, and by way of a non-limiting example, a first database table schema 502 may include a database record id, a project name, a decision topic, a project leader, a list of one or more participants of one or more group chat sessions, a list of one or more contributors of one or more resolutions and/or one or more sentiments, and/or a date and timestamp corresponding to creation and/or update of a database content item.

In some embodiments, and by way of a non-limiting example, a second database table schema 504 may include a database record id, description of a resolution by a contributor, a list including pros for the resolution, a list including cons for the resolution, a number of likes, a number of dislikes, and/or a number of stakeholders who chose to remain neutral, and a flag indicating a resolution selected by approvers. By way of a non-limiting example, one or more opted resolutions and/or a summary of the one or more opted resolutions may also be included in one or more database record items.

As described herein, a DDS (e.g., the DDS 130) may populate one or more database content items in database tables of database table schemas 502 and 504, and a document management service (e.g., the document management service 128) may generate a document page using information stored in the database table of database table schemas 502 and 504.

These foregoing embodiments depicted in FIG. 5 and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 6:
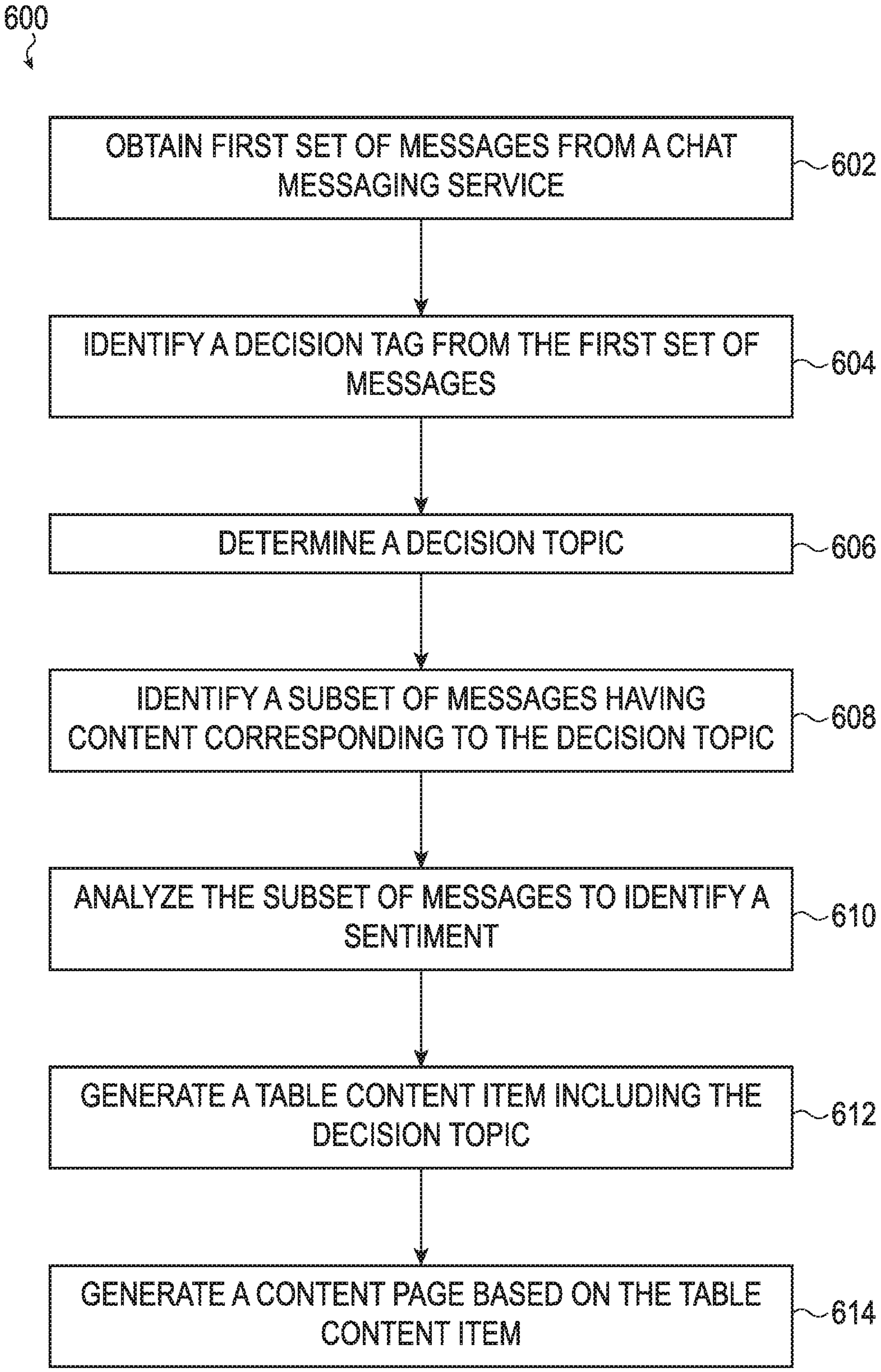
FIG. 6 depicts a flow-chart corresponding to example operations of a method for generating a tracking document on a document management system, in accordance with some embodiments.

FIG. 6 depicts a flow-chart corresponding to example operations of a method for generating a tracking document on a document management system, in accordance with some embodiments. The flow-chart shown in FIG. 6 describes example operations for maintaining discussion thread data captured during an online chat. As described herein, each group chat session may be identified by a group chat session identifier, and includes one or more messages and/or other type of contents (e.g., one or more documents in different file formats). The one or more messages and/or other type of contents may be processed, as described herein, by the DDS 130 to identify a decision topic, one or more resolutions, one or more sentiments of stakeholders, and other related information collectively referred to as a discussion thread data herein.

As shown in FIG. 6, at 602, a first set of messages including one or more messages in an online chat, such as a first group chat session 304*a*, may be obtained by a DDS, such as the DDS 130. As described herein, the online chat among group members may be hosted by a chat messaging service, such as the messaging service 134, described herein. The first set of messages may be obtained by the DDS 130 using an API call to the messaging service (or chat service) 134. In some embodiments, and by way of a non-limiting example, the first set of messages may be periodically sent to the DDS 130 by the messaging service 134.

At 604, the first set of messages received at 602 may be analyzed by the DDS 130 to identify a decision flag portion. As described herein, in accordance with some embodiments, a decision flag may be identified using a specific keyword, such as /d. In some embodiments, and by way of a non-limiting example, a decision flag may be identified using a natural language processing model based on a set of keywords and/or phrases. The set of keywords and/or phrases may be configurable. The one or more messages in the first set of messages may include a decision flag identified by a specific keyword, such as /d. Other examples of specific keywords may include a hashtag (#) and/or at sign (@).

At 606, based on the identified decision flag included in one or more messages of the first set of messages, content of the one or more messages may be extracted. The extracted content may be then analyzed by the DDS 130 using a natural language processing model to identify a decision topic, for example, a particular issue requiring resolution. Upon identifying the decision topic, an author of the decision topic may be identified based on a message sender of a message in which the decision topic is mentioned. The message sender may be identified by a user name and/or other types of user identification.

At 608, a subset of messages from the first set of messages including content corresponding to the decision topic may be identified. In some embodiments, a specific keyword, such as /d, may identify a subset of messages including content corresponding to the decision topic. In some embodiments, and by way of a non-limiting example, the DDS 130 may also analyze the content of each of the first set of messages and/or one or more messages including the specific keyword to identify the subset of messages that include content corresponding to the decision topic.

At 610, the DDS 130 may analyze the subset of messages to determine a sentiment included in one or more messages of the subset of messages. As described herein, the sentiment may include a positive sentiment, a negative sentiment, or a neutral sentiment. By way of a non-limiting example, the sentiment may also include a resolution related to the decision topic. As described herein, a natural language processing model may be used by the DDS 130 to determine the sentiment. The sentiment may be expressed by a stakeholder using statements, icons, emojis, and so on. In some cases, the sentiment may be expressed using icons and/or emojis (or in non-textual form or using a graphical element), for example, thumbs up and/or thumbs down, and so on. The sentiment expressed in non-textual form may be converted into textual form by the DDS 130 using a natural language processing model.

At 612, the DDS 130 may generate one or more database table content items including the decision topic, the decision author, and at least one indicia related to the sentiment of the one or more messages included in the subset of messages. As described herein, the DDS 130 may generate one or more database content items for one or more database tables according to database table schemas, as described herein, in accordance with some embodiments in FIG. 5.

At 614, the DDS 130 may invoke an API call to the document management service 128 causing to generate a content page by importing information stored in the one or more database content items at 612. The content page may be generated and/or hosted by a content collaboration service (e.g., a document management service 128). Thus, information stored in the one or more table content items may be displayed on a client device in response to a request to view the content page. As described herein, in accordance with some embodiments, In some embodiments, a decision flag may be identified using an NLP model based on identification of a decision topic using a set of keywords, phrases, and/or sequence of words, as described herein, with reference to FIG. 3A. As described above, an NLP model may use a set of keywords, phrases, and/or sequence of words including "new," "use," "good point," "for example," "configurable," "option," and/or "believe," and so on to identify a decision topic, a resolution, pros and cons of a resolution, and/or a sentiment of a participant user (as described herein). The NLP model may also use a non-textual form of expression such as an icon or an emoji (such as a thumbs up, a thumbs down, and so on) to identify the sentiment of a participant user (as described herein).

These foregoing embodiments depicted in FIGS. 6-8 and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A computer-implemented method for maintaining discussion thread data captured during an online chat, the computer-implemented method comprising:

obtaining a first set of messages including one or more messages from the online chat hosted by an online messaging platform using a first application programming interface call to the online messaging platform;

analyzing the first set of messages to identify a first decision flag portion based on content extracted from the first set of messages;

in response to identifying the first decision flag portion, determining a first decision topic using the content extracted from the first set of messages and a first decision author based on a first message sender of the one or more messages of the first set of messages;

identifying a first message from the first set of messages related to the first decision topic;

determining a first sentiment for the first message, the first sentiment indicating that the first decision author has expressed one of a positive sentiment, a negative sentiment, or a neutral sentiment with respect to the first decision topic;

identifying a second message from the first set of messages related to the first decision topic;

determining a second sentiment for the second message, the second sentiment indicating that the first decision author has expressed one of a positive sentiment, a negative sentiment, or a neutral sentiment with respect to the first decision topic; and in an electronic page of a content collaboration platform, different from the online messaging platform, generating a table content item, the table content item comprising:

a first set of table cells corresponding to a first option for the first decision topic, the first set of table cells comprising:

a first table cell of the first set of table cells comprising:

first textual content extracted from the first message and a first graphical element including a first non-textual indication of the determined first sentiment for the first message, the first textual content related to the first option; and second textual content extracted from the second message and a second graphical element including a second non-textual indication of the determined second sentiment for the second message, the second textual content related to a second option; and a second table cell of the first set of table cells comprising a description of the first option for the first decision topic; and a third table cell of the first set of table cells comprising an approval rating of the first option, the approval rating of the first option based at least on the first sentiment and the second sentiment; and causing display of the electronic page of the content collaboration platform, the electronic page including the first decision topic and the table content item.

2. The computer-implemented method of claim 1, further comprising:

obtaining a second set of messages including one or more messages from the online chat hosted by the online messaging platform using a second application programming interface call to the online messaging platform;

analyzing the second set of messages to identify a second decision flag portion based on third content extracted from the second set of messages;

in response to identifying the second decision flag portion, determining a second decision topic of the second set of messages using the extracted content from the second set of messages and a second decision author based on a second message sender of the one or more messages of the second set of messages;

evaluating the second decision topic of the second set of messages and the first decision topic of the first set of messages;

in response to the evaluation indicating the second decision topic of the second set of messages being same as the first decision topic of the first set of messages:

identifying a subset of messages from the second set of messages having fourth content corresponding to the second decision topic of the second set of messages or the first set of messages;

analyzing the subset of messages from the second set of messages to determine a third sentiment for one or more messages included in the subset of messages from the second set of messages; and updating the table content item, the table content item further comprising at least an indicium related to the third sentiment for the one or more messages included in the subset of messages from the second set of messages.

3. The computer-implemented method of claim 2, further comprising:

in response to determining that a fourth sentiment for one or more messages in a subset of messages from the first set of messages or the third sentiment for the one or more messages in the subset of messages from the second set of messages is in non-textual form:

generating a textual form of an indicia related to the fourth sentiment for the one or more messages in the subset of messages from the first set of messages or the third sentiment for the one or more messages in the subset of messages from the second set of messages; and updating the table content item to further include the textual form of the indicia related to the fourth sentiment for the one or more messages in the subset of messages from the first set of messages or the third sentiment for the one or more messages in the subset of messages from the second set of messages.

4. The computer-implemented method of claim 1, further comprising: identifying the first decision flag portion based on analysis of the extracted content using a natural language processing model, the natural language processing model based on a set of one or more signaling words, phrases, or symbols.

5. The computer-implemented method of claim 1, further comprising: determining the first sentiment or the second sentiment using a natural language processing model, the natural language processing model based on a set of one or more signaling words, phrases, or symbols.

6. The computer-implemented method of claim 1, further comprising:

identifying one or more users associated with the first sentiment or the second sentiment based on a contribution from each of the one or more users, the one or more users being participants of the online chat; and updating the electronic page of the content collaboration platform to further include the identified one or more users associated with a corresponding sentiment of the first sentiment and the second sentiment.

7. The computer-implemented method of claim 1, further comprising:

computing a decision metric corresponding to the first sentiment or the second sentiment indicating the positive sentiment, the negative sentiment, or the neutral sentiment from the one or more messages included in the first set of messages.

8. The computer-implemented method of claim 1, further comprising:

identifying one or more resolutions corresponding to the first decision topic by analyzing the one or more messages of the first set of messages;

identifying a sentiment on the one or more resolutions from one or more users, the one or more users being participants of the online chat; and generating and assigning a ranking order to each of the one or more resolutions based on the sentiment on the one or more resolutions.

9. The computer-implemented method of claim 8, wherein the table content item further includes the one or more resolutions and/or the ranking order assigned to each of the one or more resolutions.

10. The computer-implemented method of claim 8, further comprising:

determining an opted resolution from the one or more resolutions based on criteria including one or more of:

the ranking order assigned to each of the one or more resolutions; and the sentiment on the one or more resolutions from a particular group of users of the one or more users.

11. The computer-implemented method of claim 10, wherein the table content item further includes the opted resolution, a summary of the opted resolution, or a date corresponding to the opted resolution.

12. The computer-implemented method of claim 1, wherein the first decision flag portion is identified based on one or more designated characters including a slash command, an "@" command, or a hashtag, and wherein the first sentiment or the second sentiment is identified based on a selection of an icon or a graphical element.

13. The computer-implemented method of claim 1, further comprising:

obtaining a third set of messages including one or more messages from the online chat hosted by the online messaging platform using a second application programming interface call to the online messaging platform;

identifying a subset of messages from the third set of messages having fifth content corresponding to the first decision topic of the first set of messages;

analyzing the subset of messages from the third set of messages to determine a sentiment of one or more messages included in the subset of messages from the third set of messages; and updating the table content item for further including at least an indicium related to the sentiment of the one or more messages included in the subset of messages from the third set of messages.

14. A computer-implemented method, comprising:

extracting a plurality of digital content items from an online messaging platform, the plurality of digital content items stored in a datastore communicatively coupled with the online messaging platform;

analyzing the plurality of digital content items to identify a decision-initiating digital content item;

determining a decision topic based on content extracted from the decision-initiating digital content item;

analyzing the plurality of digital content items to identify one or more decision-related digital content items, the one or more decision-related digital content items including digital content associated with the decision topic;

identifying a first digital content item from the plurality of digital content items related to the decision topic;

determining a first sentiment for the first digital content item, the first sentiment indicating that a first creator of the first digital content item has expressed one of a positive sentiment, a negative sentiment, or a neutral sentiment with respect to the decision topic;

identifying a second digital content item from the plurality of digital content items related to the decision topic;

determining a second sentiment for the second digital content item, the second sentiment indicating that a second creator of the second digital content item has expressed one of a positive sentiment, a negative sentiment, or a neutral sentiment with respect to the decision topic; and in an electronic page of a content collaboration platform different from the online messaging platform, generating a table content item, the table content item comprising:

a first set of table cells corresponding to a first option for the decision topic, the first set of table cells comprising:

a first table cell of the first set of table cells comprising:

first textual content extracted from the first digital content item and a first graphical element including a first non-textual indication of the determined first sentiment for the first digital content item, the first textual content related to the first option; and second textual content extracted from the second digital content item and a second graphical element including a second non-textual indication of the determined second sentiment for the second digital content item, the second textual content related to a second option; and a second table cell of the first set of table cells comprising a description of the first option for the decision topic; and a third table cell of the first set of table cells comprising an approval rating of the first option, the approval rating of the first option based at least on the first sentiment and the second sentiment; and causing display of the electronic page of the content collaboration platform, the electronic page including the decision topic and the table content item.

15. The method of claim 14, wherein the plurality of digital content items includes a webpage, a digital document, an image, a chat transcript, a video recording, or an audio recording.

16. The method of claim 14, wherein the decision topic, the first sentiment or the second sentiment is identified using a natural language processing model, the natural language processing model based on a set of one or more signaling words, phrases, or symbols.

17. The method of claim 14, wherein the plurality of digital content items is a first plurality of digital content items, and one or more decision-related digital content items are included in a first set of decision-related digital content items, and wherein the method further comprises:

extracting a second plurality of digital content items from the online messaging platform, the second plurality of digital content items stored in the datastore;

analyzing the second plurality of digital content items to identify a second set of one or more decision-related digital content items, the second set of one or more decision-related digital content items including digital content associated with the decision topic;

identifying one or more resolutions, or one or more sentiments, in the second set of one or more decision-related digital content items;

updating a decision-tracking content item to include the one or more sentiments, or the one or more resolutions based on the second set of the one or more decision-related digital content items; and causing the content collaboration platform to update the electronic page of the content collaboration platform corresponding to the updated decision-tracking content item.

18. A computer-implemented method, comprising:

extracting a plurality of interactions between a plurality of users of an online messaging platform, the plurality of interactions stored in a datastore communicatively coupled with the online messaging platform;

analyzing the plurality of interactions to identify a decision-initiating interaction;

determining a decision topic based on content extracted from the decision-initiating interaction;

analyzing the plurality of interactions to identify one or more decision-related interactions, the one or more decision-related interactions including content associated with the decision topic;

identifying a first resolution related to the decision topic from the one or more decision-related interactions;

determining a first sentiment for the first resolution, the first sentiment indicating that a first user of the plurality of users associated with the first resolution has expressed one of a positive sentiment, a negative sentiment, or a neutral sentiment with respect to the decision topic;

identifying a second resolution related to the decision topic from the one or more decision-related interactions;

determining a second sentiment for the second resolution, the second sentiment indicating that a second user of the plurality of users associated with the second resolution has expressed one of a positive sentiment, a negative sentiment, or a neutral sentiment with respect to the decision topic;

identifying a content page on a content collaboration platform associated with the decision topic, the content collaboration platform different from the online messaging platform;

in the content page of the content collaboration platform, generating a table content item, the table content item comprising a first set of table cells corresponding to a first option for the first decision topic, the first set of table cells comprising:

a first table cell of the first set of table cells comprising:

first textual content extracted from the first resolution and a first graphical element including a first non-textual indication of the determined first sentiment for the first resolution, the first textual content related to the first option; and second textual content extracted from the second resolution and a second graphical element including a second non-textual indication of the determined second sentiment for the second resolution, the second textual content related to a second option; and a second table cell of the first set of table cells comprising a description of the first option for the decision topic; and a third table cell of the first set of table cells comprising an approval rating of the first option, the approval rating of the first option based at least on the first sentiment and the second sentiment; and causing display of the content page of the content collaboration platform, the content page including the decision topic and the table content item.

19. The method of claim 18, wherein the plurality of interactions includes a document, a comment, a like, a dislike, a webpage creation, a webpage modification, a webpage removal, an image, a chat message, a video recording, or an audio recording.

20. The method of claim 18, wherein the decision topic, the first sentiment, the second sentiment, the first resolution, or the second resolution is identified using a natural language processing model, the natural language processing model based on a set of one or more signaling words.

* * * * *